(12) United States Patent
Clement et al.

(10) Patent No.: US 8,697,979 B1
(45) Date of Patent: Apr. 15, 2014

(54) SOLAR-POWERED SYSTEM FOR GENERATION AND STORAGE OF HYDROGEN GAS IN SUBSTRATE MICROSTRUCTURES

(75) Inventors: Russel E. Clement, El Cajon, CA (US); Ayax D. Ramirez, Chula Vista, CA (US); Jacob E. Clement, El Cajon, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1226 days.

(21) Appl. No.: 12/538,231

(22) Filed: Aug. 10, 2009

Related U.S. Application Data

(60) Provisional application No. 61/178,844, filed on May 15, 2009.

(51) Int. Cl.
  *C25B 1/04* (2006.01)
  *C25B 9/00* (2006.01)
  *C25B 9/12* (2006.01)
  *C25B 9/16* (2006.01)
  *H01L 31/18* (2006.01)

(52) U.S. Cl.
  USPC ............ 136/243; 136/244; 136/252; 204/242; 204/193; 204/194; 204/278

(58) Field of Classification Search
  CPC ............ H01L 31/18; H01L 31/022425; H01L 31/0504; H01L 31/042; H01L 31/02008; H01L 31/02167; H01L 31/048; C25B 1/03; C25B 1/04; C25B 9/00; C25B 9/12; C25B 9/16
  USPC .......... 136/243, 244, 252; 204/143, 193, 194, 204/278
  See application file for complete search history.

(56) References Cited

U.S. PATENT DOCUMENTS

| | | | |
|---|---|---|---|
| 5,955,749 A * | 9/1999 | Joannopoulos et al. | 257/98 |
| 8,304,795 B2 * | 11/2012 | Yamaguchi et al. | 257/98 |
| 8,486,551 B2 * | 7/2013 | Okoye et al. | 429/111 |
| 2005/0183962 A1 | 8/2005 | Oakes | |
| 2005/0205128 A1 * | 9/2005 | Deng et al. | 136/256 |
| 2005/0211290 A1 * | 9/2005 | Deng et al. | 136/252 |
| 2007/0138006 A1 | 6/2007 | Oakes et al. | |
| 2010/0003573 A1 * | 1/2010 | Jeanne et al. | 429/34 |

* cited by examiner

*Primary Examiner* — Harry D Wilkins, III
*Assistant Examiner* — Zulmariam Mendez
(74) *Attorney, Agent, or Firm* — SPAWAR Systems Center Pacific; Kyle Eppele; Ryan J. Friedl

(57) ABSTRACT

A system includes a microstructure layer, a photovoltaic layer disposed over the microstructure layer comprising a positive P-type layer and a negative N-type layer, a hydrogen collection micro-chamber formed through the microstructure layer and the negative layer, and an oxygen collection micro-chamber formed through the microstructure layer and the photovoltaic layer. A cathode may be disposed within the hydrogen collection micro-chamber and an anode may be disposed within the oxygen collection micro-chamber. The micro-chambers may be spaced between about 1 and 10 micrometers apart. An insulating layer may be disposed between the microstructure layer and the photovoltaic layer. A supplemental storage layer may be disposed over the photovoltaic layer such that a storage portion is in alignment with the hydrogen collection micro-chamber. MEMS actuators may be located at the ends of the hydrogen collection micro-chamber to facilitate hydrogen storage and release.

20 Claims, 4 Drawing Sheets

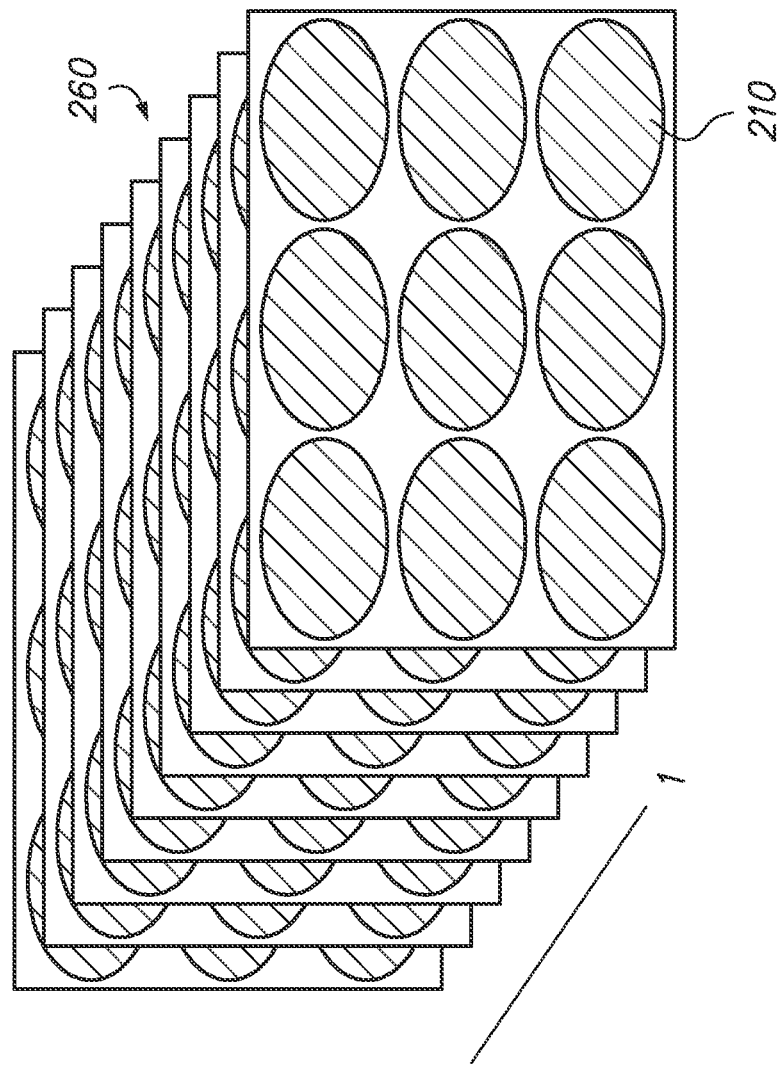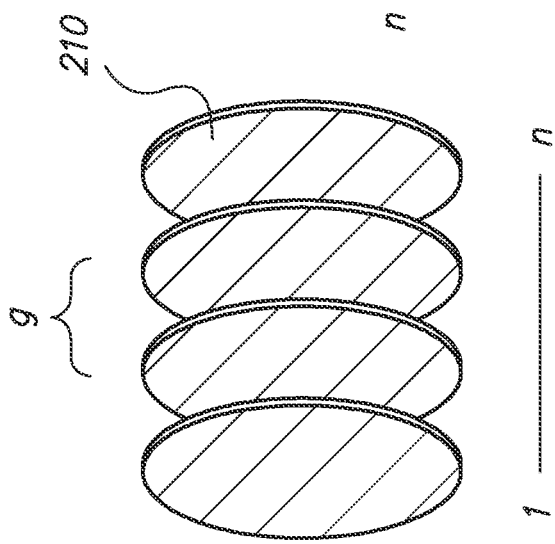
FIG. 4B
FIG. 4A

SOLAR-POWERED SYSTEM FOR GENERATION AND STORAGE OF HYDROGEN GAS IN SUBSTRATE MICROSTRUCTURES

CROSS-REFERENCE TO RELATED APPLICATIONS

This application claims the benefit of U.S. Provisional Patent Application Ser. No. 61/178,844, filed May 15, 2009, entitled "Solar-Powered Device for Generation and Storage of Hydrogen Gas in Substrate Microstructures," the content of which is fully incorporated by reference herein.

FEDERALLY SPONSORED RESEARCH AND DEVELOPMENT

The Solar-Powered System for Generation and Storage of Hydrogen Gas in Substrate Microstructures is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email ssc_pac_T2@navy.mil. Reference Navy Case No. 99707.

BACKGROUND

Fossil fuels are currently the primary source used to generate electricity and are the major source of fuel-energy for our various modes of transportation and electrical energy production. It is widely believed that hydrogen fuel cells are a promising technology for generating electricity on a commercial scale needed to replace existing fossil fuel systems. Hydrogen is one of the most abundant elements on Earth, and when combined with oxygen in standard fuel cell reactions, produces only pure water and usable energy.

Hydrogen in its gaseous form is currently produced from either fossil fuel-powered commercial processes or is a captured byproduct of conversion from natural gas and petroleum. Using existing methods, commercial production of hydrogen for large scale use in fuel cells would be expected to contribute significantly to global fossil fuel emissions. In addition, storage of hydrogen gas for use in fuel cells and commercial refueling centers poses an extreme explosive hazard.

One method for hydrogen storage that has been shown to greatly reduce the explosive hazard is to suspend the hydrogen in the molecular structure of glass beads. Hydrogen suspended in the microstructure of glass beads is safe for long term storage and transfer. The suspended hydrogen can be released in a controlled manner by heating the beads. However, a disadvantage of this approach is that fossil fuels are generally used to provide the energy for the processes used to produce the hydrogen gas and impregnate the beads under pressure.

There are two persistent problems for implementing wide spread use of hydrogen fuel cell technologies: 1) how to produce hydrogen on a large scale without using fossil fuels, and 2) how to provide a safe method of storing and transferring hydrogen in a useable form with processes that do not require energy from fossil fuels. Electrolysis, a widely known and used technique, provides one method to generate hydrogen without using fossil fuels. A need still exists for a system that can safely store and transfer hydrogen in a usable form with processes that do not require energy from fossil fuels, and that can readily be integrated into a variety of devices without requiring a significant amount of device space.

BRIEF DESCRIPTION OF THE DRAWINGS

FIGS. 4A and 4B show diagrams illustrating embodiments of stacked semiconductor wafer systems in accordance with the Solar-Powered System for Generation and Storage of Hydrogen Gas in Substrate Microstructures.

DETAILED DESCRIPTION OF SOME EMBODIMENTS

Figure 1:
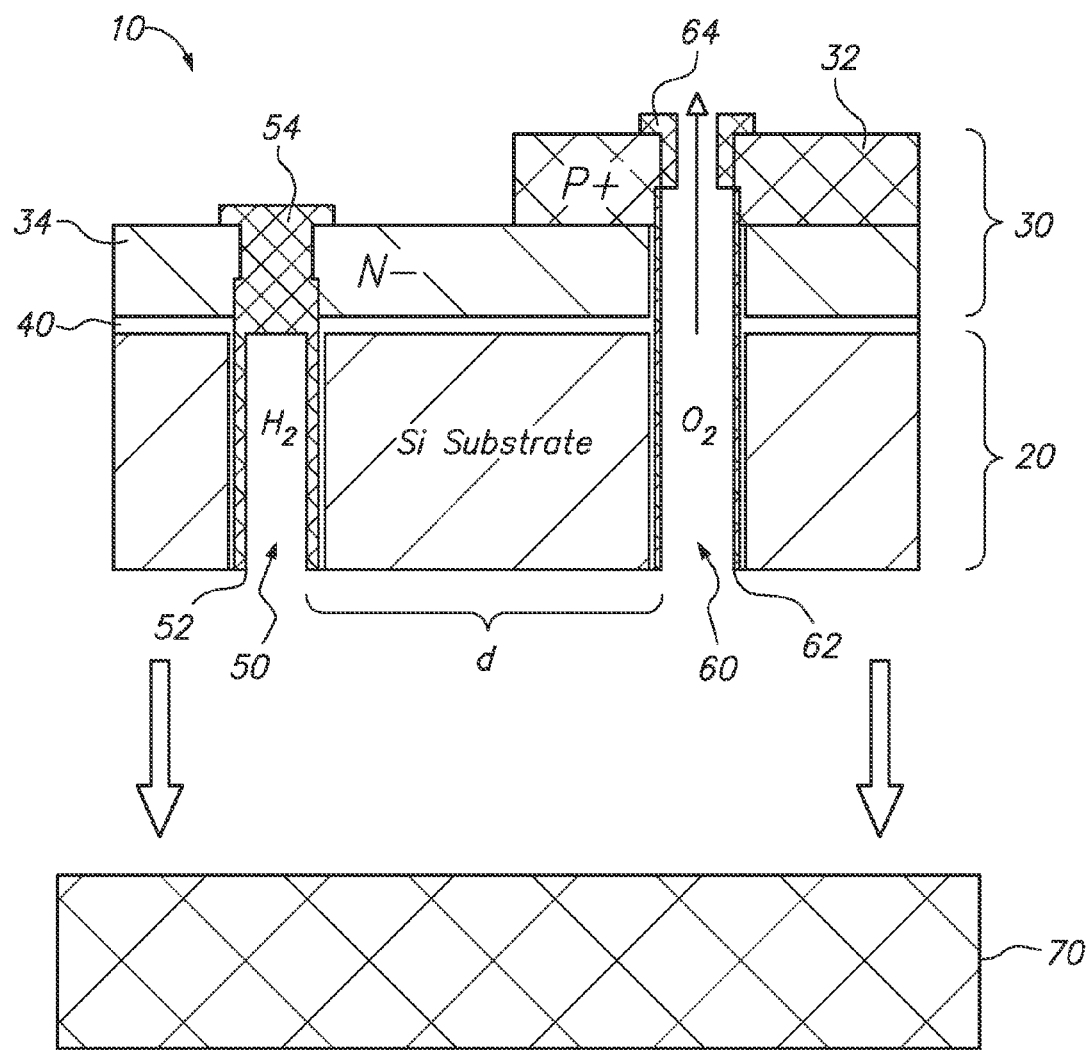
FIG. 1 shows a diagram of an embodiment of a system in accordance with the Solar-Powered System for Generation and Storage of Hydrogen Gas in Substrate Microstructures.

FIG. 1 shows a diagram of an embodiment of a system 10 in accordance with the Solar-Powered System for Generation and Storage of Hydrogen Gas in Substrate Microstructures. System 10 may include a microstructure layer 20, a photovoltaic layer 30, an insulating layer 40, a hydrogen collection micro-chamber 50, and an oxygen collection micro-chamber 60. Microstructure layer 20 may be comprised of a semiconductor material, such as Si or GaAs.

Photovoltaic layer 30 may be disposed over microstructure layer 20 and may comprise a positive P-type layer 32 and a negative N-type layer 34. Hydrogen collection micro-chamber 50 may be formed through microstructure layer 20 and negative N-type layer 34. Oxygen collection micro-chamber 60 may be formed through microstructure layer 20 and photovoltaic layer 30. In some embodiments, oxygen collection micro-chamber 60 is spaced a distance d of between about 1 and about 10 micrometers from hydrogen collection micro-chamber 50. In other embodiments, the distance d between hydrogen collection micro-chamber 50 and oxygen collection micro-chamber 60 may range between 1 and 100 micrometers.

Insulating layer 40 may be disposed between microstructure layer 20 and photovoltaic layer 30. In some embodiments, insulating layer 40 is further disposed between the microstructure layer 20 and hydrogen collection micro-chamber 50. Still in other embodiments, insulating layer 40 is further disposed between oxygen collection micro-chamber 60 and microstructure layer 20 and negative N-type layer 34. Insulating layer 40 may comprise materials such as Silicon Dioxide ($SiO_2$), Silicon Oxide (SiO), Zinc Sulfide (ZnS) or insulating polymer such as Parylene® or any other of a variety of chemical vapor deposited poly (p-xylylene) polymers. The size and shape of hydrogen collection micro-chamber 50 and oxygen collection micro-chamber 60 may vary depending on the particular application and configuration of system 10. In some embodiments, hydrogen collection micro-chamber 50 and oxygen collection micro-chamber 60 may each have a diameter between about 1 micron and about 10 microns and a depth of between about 10 and about 100 microns. In other embodiments, the diameters may range between about 1 micron and about 100 microns. Further, as an example, the depths of hydrogen collection micro-chamber 50 and oxygen collection micro-chamber 60 may be about 20 microns.

Hydrogen collection micro-chamber 50 may further include a coating layer (not shown), disposed at least partially on the interior portion thereof, to enhance the storage and release of hydrogen. The coating layer may comprise an amorphous material. As an example, the coating layer may comprise zinc sulfide (ZnS), silicon dioxide ($SiO_2$), Silicon Oxide (SiO), or polymer coatings such as Parylene® or any other of a variety of chemical vapor deposited poly (p-xylylene) polymers.

Hydrogen collection micro-chamber 50 may have a cathode 52 disposed therein. System 10 may also include a first contact pad 54, connected to cathode 52, partially disposed on negative N-type layer 34 and partially disposed within hydrogen collection micro-chamber 50. System 10 may further include a second contact pad 64, connected to anode 62, partially disposed on positive P-type layer 32 and partially disposed within oxygen collection micro-chamber 60. First contact pad 54 and second contact pad 64 allow system 10 to be electrically connected to other systems, as well as allow a voltage bias to be introduced to the electrodes. As shown in FIG. 1, first contact pad 54 may be configured such that it prevents hydrogen from escaping hydrogen collection micro-chamber 50. Further, second contact pad 64 may be configured such that it has an opening that allows oxygen to escape oxygen collection micro-chamber 60, as shown by the arrow.

In operation, system 10 is placed (as shown by the arrows) in contact with or upon the surface of an ionic liquid 70. One example of a suitable and readily available ionic liquid 70 is seawater. Under solar illumination, photovoltaic layer 30 generates a voltage (V) that drives a DC current (I) through ionic liquid 70 between cathode 52 and anode 62. The distance between cathode 52 and anode 62 is determined by the spacing of micro-chambers 50 and 60.

The electrical resistance of ionic liquid 70 may be described in resistance (in ohms) per unit length. For water electrolysis, the current (I) flowing between the cathode 52 and anode 62 under an applied bias can be maximized by minimizing the path length between the submerged electrodes. It is beneficial to take advantage of the small physical scale of the individual photo-voltaic cell for driving current for water electrolysis. To do so, a physical microstructure on the order of microns is required to establish the electrode positioning and electrical isolation at cathode 52. The physical microstructure of system 10 can be provided in silicon substrates using high density vertical via (tunnel) fabrication methods that are capable of forming vias as small as 2 microns in diameter and 20 microns in depth.

The power (P) generated by system 10 may be determined by the relationship, $P=V^2/R$, where R is the resistance of ionic liquid 70 between cathode 52 and anode 62. For seawater, the resistance (R) over a 10 micron path is $\sim 2.2 \times 10^{-2}$ ohms. Typical commercial grade solar arrays generate 0.08 watts/$in^2$ of electrical energy. This scales to a maximum power of $7.44 \times 10^{-8}$ watts for each system 10 (~40 micro-volts at each P-N junction when illuminated). It takes about 240 kilojoules to generate 1 Mole of hydrogen with minimal loss due to heating. The volume of a collection micro-chamber that measures 2 microns in diameter and 20 microns deep can hold $2.61 \times 10^{-15}$ Moles of hydrogen gas at STP. The electrical energy needed to fill a hydrogen collection micro-chamber of these dimensions under STP conditions is therefore approximately $6.27 \times 10^{-10}$ Joules (1 Joule=1 Watt-sec). Under such conditions, system 10 is thus capable of filling hydrogen collection micro-chamber 50 every 8.4 milliseconds.

Figure 2:
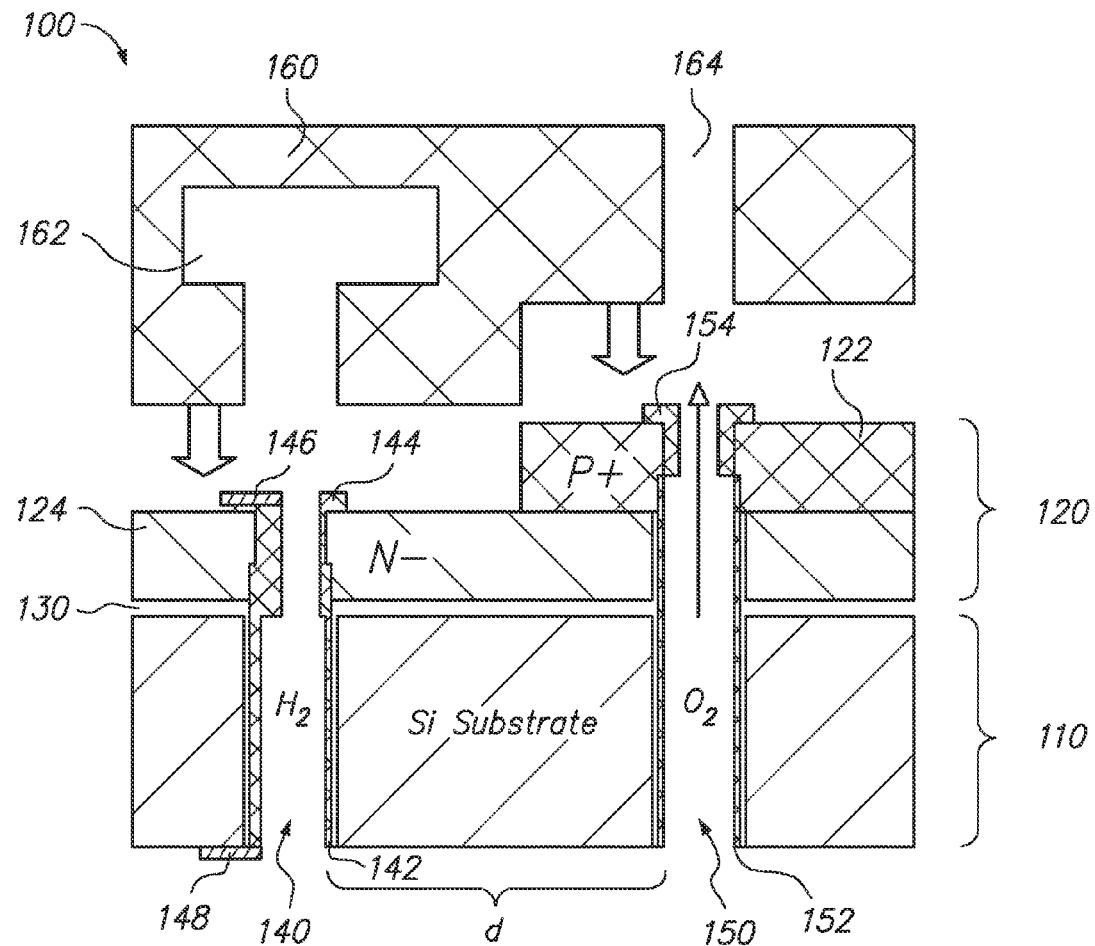
FIG. 2 shows a diagram of another embodiment of a system in accordance with the Solar-Powered System for Generation and Storage of Hydrogen Gas in Substrate Microstructures.

FIG. 2 shows a diagram of another embodiment of a system 100 in accordance with the Solar-Powered System for Generation and Storage of Hydrogen Gas in Substrate Microstructures. Components of system 100 having the same name as components of system 10 may have the same configuration as those components of system 10. System 100 may include a microstructure layer 110, a photovoltaic layer 120, an insulating layer 130, a hydrogen collection micro-chamber 140, an oxygen collection micro-chamber 150, and a supplemental storage layer 160.

System 100 may also include a cathode disposed within hydrogen collection micro-chamber 140 and an anode disposed within oxygen collection micro-chamber 150. System 100 may also include a first contact pad 144, connected to cathode 142, partially disposed on negative N-type layer 124 and partially disposed within hydrogen collection micro-chamber 140. System 100 may further include a second contact pad 154, connected to anode 152, partially disposed on positive P-type layer 122 and partially disposed within oxygen collection micro-chamber 150.

Hydrogen gas can be safely stored in hydrogen collection micro-chamber 140 and released in a controlled incremental fashion by increasing the pressure in the hydrogen collection micro-chamber 140. This can be accomplished by using mechanical, electrical, or thermal means. One example of electrical control may occur by using a reverse voltage bias.

An example of a system 100 using mechanical means may include a first micro electrical-mechanical system (MEMS) actuator 146 located at one end of the hydrogen collection micro-chamber 140 and a second MEMS actuator 148 located at the other end of the hydrogen collection micro-chamber 140. In some embodiments, MEMS actuators 146 and 148 may be connected to cathode 142. In other embodiments, MEMS actuator 146 may be connected to contact pad 144 and MEMS actuator 148 may be connected to cathode 142. Still in other embodiments, MEMS actuator 146 may be connected to negative N-type layer 124 and MEMS actuator 148 may be connected to microstructure layer 110. MEMS actuators 146 and 148 may be configured to rotate over and cover the respective openings of hydrogen collection micro-chamber 140, and thus either store hydrogen in the chamber or release hydrogen from the chamber. After the hydrogen has been released from hydrogen collection micro-chamber 140, system 100 may be placed in contact with an ionic liquid in sunlight and the collection micro-chambers 140 and 150 will be refilled.

In some embodiments, system 100 may further include a supplemental storage layer 160. Supplemental storage layer 160 may include a storage portion 162 and an oxygen outlet portion 164. Supplemental storage layer 160 may be disposed over photovoltaic layer 130 (as shown by the arrows) such that storage portion 162 is in alignment with at least a portion of hydrogen collection micro-chamber 140 and oxygen outlet portion 164 is in alignment with at least a portion of oxygen collection micro-chamber 150. In some embodiments, supplemental storage layer 160 comprises a transparent material such as Chemical Vapor Deposited (CVD) diamond, Zinc Sulfide (ZnS), sapphire (Al2O3) or glass. In embodiments of system 100 including MEMS actuators 146 and 148, supplemental storage layer 160 may be physically designed such that the functionality of MEMS actuators 146 and 148 is not hindered by supplemental storage layer 160, as would be understood by one having ordinary skill in the art.

Figure 3:
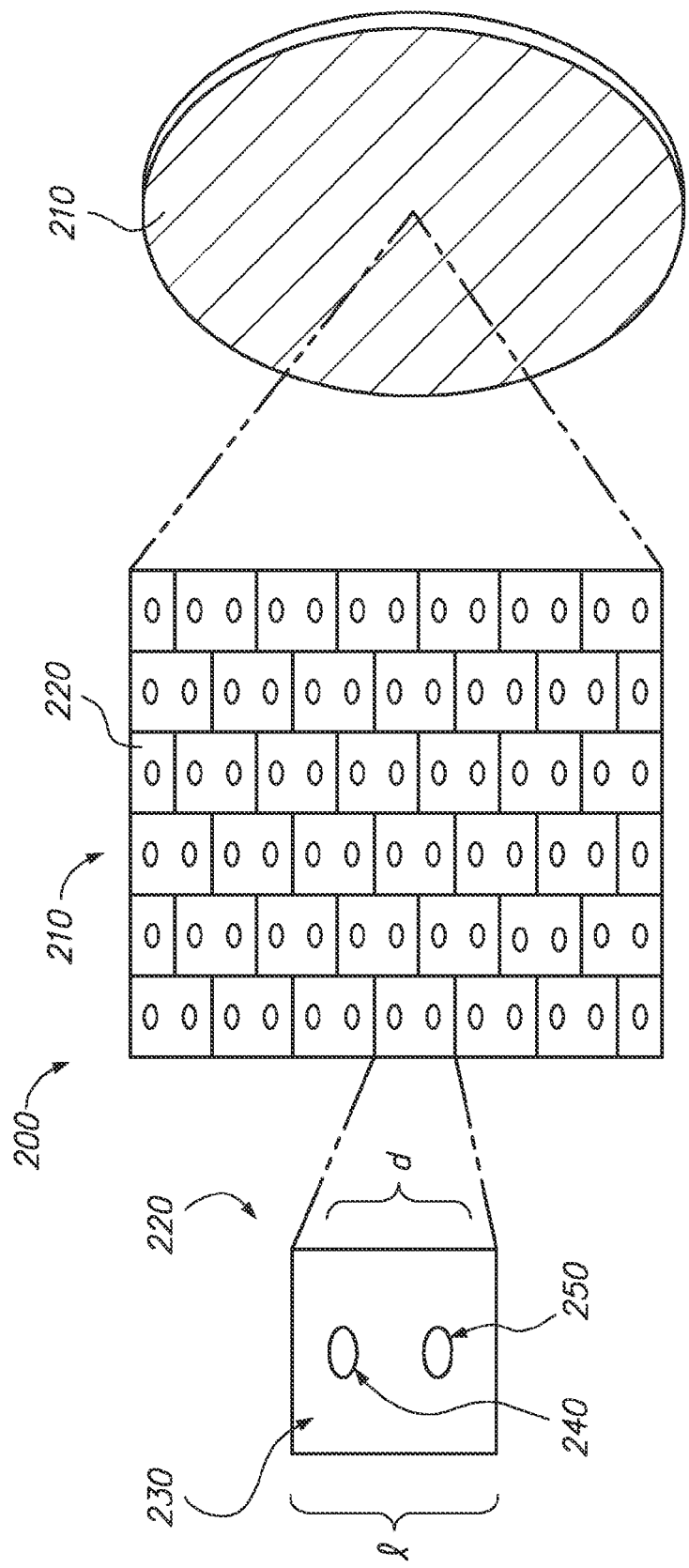
FIG. 3 shows a diagram of an embodiment of a semiconductor wafer system including a plurality of uniformly distributed solar-powered systems for generation and storage of hydrogen gas in substrate microstructures.

FIG. 3 shows a diagram of an embodiment of a semiconductor wafer system 200 including a plurality of uniformly distributed solar-powered systems for generation and storage of hydrogen gas in substrate microstructures 220 formed on a semiconductor wafer 210. As shown, systems 220 are arranged in a spatially uniform array-like pattern on semiconductor wafer 210. Each of systems 220, having a length l, include a photovoltaic layer 230 and a microstructure layer (not shown), as well as a hydrogen collection micro-chamber 240 separated from a oxygen collection micro-chamber 250 by a distance d.

Approximately $6.84 \times 10^7$ active hydrogen collection micro-chambers could be contained on an array of systems 220 on a 9-inch semiconductor wafer 210 as shown in FIG. 3. Each wafer 210 could be expected to store approximately $1.79 \times 10^{-7}$ moles of hydrogen for each charge. Given that micro-chambers 240 and 250 of systems 220 would fill simultaneously, a single 9-inch wafer 210 would theoretically generate hydrogen gas ($H_2$) at a rate of $2.13 \times 10^{-5}$ Moles/sec when in contact with seawater under these conditions. A 50% efficient conversion of $2.13 \times 10^{-5}$ moles of hydrogen each second to electrical energy in a hydrogen fuel cell yields approximately 2.5 joules of useable electric power generated each second (2.5 watts) by a single wafer. This number could be enhanced by optimizing the size of hydrogen collection micro-chamber 240, such as by using a supplemental storage layer, or by increasing the number of systems 220 per square inch.

FIGS. 4A and 4B show diagrams illustrating stacked semiconductor wafer embodiments in accordance with the Solar-Powered System for Generation and Storage of Hydrogen Gas in Substrate Microstructures. The volume of hydrogen storage may be increased dramatically by stacking semiconductor wafers as shown. It is possible to stack 100-micron thick semiconductor wafers to achieve a wafer density exceeding 100 wafers per inch allowing for a 100-micron air-gap g between wafers as shown in FIG. 4A. In an approximate 30 inch cube of semiconductor wafer arrays 260 as shown in FIG. 4B, enough hydrogen gas could be stored to generate over 65 kilowatts of electricity at 50% conversion efficiency.

The systems described herein, such as systems 10, 100, and 200, may be applied to any type of system that can utilize hydrogen to generate electricity, including, but not restricted to, those requiring safe storage and transfer of hydrogen gas. Wafer stacking systems, such as system 200 shown in FIGS. 4A and 4B, could be used to tailor the storage volumes for particular commercial applications and to protect the wafers from damage. Applications for systems 10, 100, and 200 include, but are not limited to, homes, vehicles, and power generating stations that use hydrogen fuel cell technologies.

Many modifications and variations of the Solar-Powered System for Generation and Storage of Hydrogen Gas in Substrate Microstructures are possible in light of the above description. Within the scope of the appended claims, the embodiments of the systems described herein may be practiced otherwise than as specifically described. The scope of the claims is not limited to the implementations and embodiments disclosed herein, but extends to other implementations and embodiments as may be contemplated by those having ordinary skill in the art.

We claim:

1. A system comprising:
    a microstructure layer;
    a photovoltaic layer, disposed over the microstructure layer, comprising a positive P-type layer and a negative N-type layer;
    a hydrogen collection micro-chamber formed through the microstructure layer and the negative layer;
    a cathode disposed within the hydrogen collection micro-chamber;
    an oxygen collection micro-chamber formed through the microstructure layer and the photovoltaic layer, wherein the oxygen collection micro-chamber is spaced between about 1 and about 10 micrometers from the hydrogen collection micro-chamber; and
    an anode disposed within the oxygen collection micro-chamber.

2. The system of claim 1 further comprising an insulating layer disposed between the microstructure layer and the photovoltaic layer.

3. The system of claim 2, wherein the insulating layer is further disposed between the microstructure layer and the cathode and between the microstructure layer and the negative N-type layer and the anode.

4. The system of claim 1 further comprising a coating layer disposed on the interior portion of the hydrogen collection micro-chamber.

5. The system of claim 4, wherein the coating layer is selected from the group of coating layers consisting of zinc sulfide, silicon dioxide, and di-p-xylylene.

6. The system of claim 1 further comprising a first micro electrical-mechanical system (MEMS) actuator located at one end of the hydrogen collection micro-chamber and a second MEMS actuator located at the other end of the hydrogen collection micro-chamber.

7. The system of claim 1, wherein the hydrogen collection micro-chamber and the oxygen collection micro-chamber each have a diameter between about 1 micron and about 10 microns.

8. The system of claim 1, wherein the microstructure layer and the photovoltaic layer are formed on a semiconductor wafer and are arranged in a spatially uniform array-like pattern.

9. They system of claim 1 further comprising:
    a first contact pad, connected to the cathode, partially disposed on the negative N-type layer and partially disposed within the hydrogen collection micro-chamber; and
    a second contact pad, connected to the anode, partially disposed on the positive P-type layer and partially disposed within the oxygen collection micro-chamber.

10. The system of claim 1, wherein the microstructure layer comprises a semiconductor material.

11. The system of claim 1 further comprising a supplemental storage layer, disposed over the photovoltaic layer, having a storage portion in alignment with at least a portion of the hydrogen collection micro-chamber.

12. The system of claim 11, wherein the supplemental storage layer comprises a transparent material.

13. A system comprising:
    a semiconductor wafer containing a plurality of solar-powered hydrogen generation and storage systems uniformly distributed thereon each comprising
    a microstructure layer;
    a photovoltaic layer, disposed over the microstructure layer, comprising a positive P-type layer and a negative N-type layer;
    a hydrogen collection micro-chamber formed through the microstructure layer and the negative N-type layer;
    a cathode disposed within the hydrogen collection micro-chamber;
    an oxygen collection micro-chamber formed through the microstructure layer and the photovoltaic layer, wherein the oxygen collection micro-chamber is spaced between about 1 and about 10 micrometers from the hydrogen collection micro-chamber;
    an anode disposed within the oxygen collection micro-chamber; and an insulating layer disposed between the microstructure layer and the photovoltaic layer and between the microstructure layer and the cathode.

14. The system of claim 13, wherein the insulating layer is further disposed between the microstructure layer and the negative N-type layer and the anode.

15. The system of claim 13, wherein each solar-powered hydrogen generation and storage system further comprises a first MEMS actuator located at one end of the hydrogen collection micro-chamber and a second MEMS actuator located at the other end of the hydrogen collection micro-chamber.

16. The system of claim 13, wherein each solar-powered hydrogen generation and storage system further comprises:
   a first contact pad, connected to the cathode, partially disposed on the negative N-type layer and partially disposed within the hydrogen collection micro-chamber; and
   a second contact pad, connected to the anode, partially disposed on the positive P-type layer and partially disposed within the oxygen collection micro-chamber.

17. The system of claim 13, wherein each solar-powered hydrogen generation and storage system further comprises a transparent supplemental storage layer, disposed over the photovoltaic layer, having a storage portion in alignment with at least a portion of the hydrogen collection micro-chamber.

18. A system comprising:
   a plurality of stacked semiconductor wafers, each semiconductor wafer containing a plurality of solar-powered hydrogen generation and storage systems arranged on the semiconductor wafer in a spatially uniform array-like pattern, each of the plurality of solar-powered hydrogen generation and storage systems comprising
      a microstructure layer;
      a photovoltaic layer, disposed over the microstructure layer, comprising a positive P-type layer and a negative N-type layer;
      a hydrogen collection micro-chamber formed through the microstructure layer and the negative N-type layer;
      a cathode disposed within the hydrogen collection micro-chamber;
      an oxygen collection micro-chamber formed through the microstructure layer and the photovoltaic layer, wherein the oxygen collection micro-chamber is spaced between about 1 and about 10 micrometers from the hydrogen collection micro-chamber;
      an anode disposed within the oxygen collection micro-chamber;
      an insulating layer disposed between the microstructure layer and the photovoltaic layer, between the microstructure layer and the cathode, and between the microstructure layer and the negative N-type layer and the anode; and
      a transparent supplemental storage layer, disposed over the photovoltaic layer, having a storage portion in alignment with at least a portion of the hydrogen collection micro-chamber.

19. The system of claim 18, wherein each solar-powered hydrogen generation and storage system further comprises:
   a first contact pad, connected to the cathode, partially disposed on the negative layer and partially disposed within the hydrogen collection micro-chamber;
   a second contact pad, connected to the anode, partially disposed on the positive layer and partially disposed within the oxygen collection micro-chamber;
   a first MEMS actuator located at one end of the hydrogen collection micro-chamber; and
   a second MEMS actuator located at the other end of the hydrogen collection micro-chamber.

20. The system of claim 18 further comprising a coating layer disposed on the interior portion of the hydrogen collection micro-chamber, wherein the coating layer is selected from the group of coating layers consisting of zinc sulfide, silicon dioxide, and di-p-xylylene.

* * * * *